United States Patent

[11] 3,609,688

[72] Inventor James T. Koo
Walnutport, Pa.

[21] Appl. No. 854,874
[22] Filed Sept. 3, 1969
[45] Patented Sept. 28, 1971

[73] Assignee Bell Telephone Laboratories, Incorporated
Murray Hill, N.J.

[54] CODE TRANSLATOR FOR USE IN AN ASSOCIATIVE MEMORY SYSTEM
7 Claims, 1 Drawing Fig.

[52] U.S. Cl. .......... 340/147 R, 307/243, 328/104, 340/147 LP, 340/147 T, 340/147 CN
[51] Int. Cl. .......... H04q 9/00
[50] Field of Search .......... 340/147, 147 LP, 147 T, 147 CN, 147 C; 179/18 TR; 328/99, 104, 119; 307/231, 243

[56] References Cited
UNITED STATES PATENTS

| | | | |
|---|---|---|---|
| 3,311,881 | 3/1967 | Mellott .......... | 340/147 ILP |
| 3,522,587 | 8/1970 | Brown, Jr. .......... | 340/147 |

*Primary Examiner*—Donald J. Yusko
*Attorneys*—R. J. Guenther and Kenneth B. Hamlin

ABSTRACT: A diode code translator circuit is described in which inhibiting transistors are driven by coded output signals to inhibit concurrent input signals in a predetermined priority pattern. The uninhibited input signals drive an OR gate to provide a transfer signal for gating the coded output signals.

A system for cascading the code translator circuits of this invention is also shown in which the transfer signals from a plurality of the code translator circuits serve as input signals to a succeeding stage. The transfer signal from the succeeding stage serves as the gating signal. In this arrangement, the coded output signals from the plurality of code translation circuits are connected in parallel to extend the priority sequence to the cascaded system.

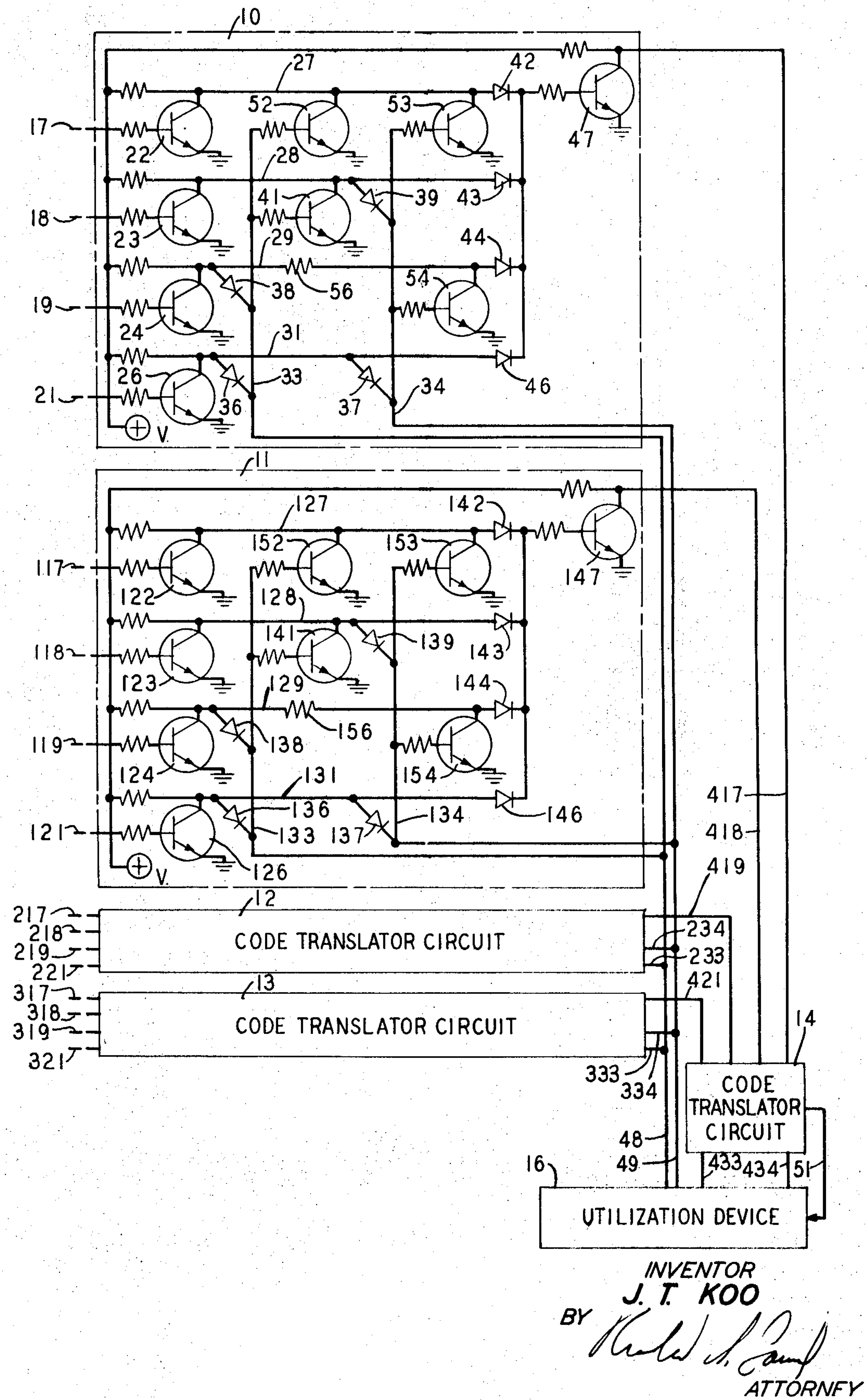
INVENTOR
J. T. KOO
BY
ATTORNEY

CODE TRANSLATOR FOR USE IN AN ASSOCIATIVE MEMORY SYSTEM

FIELD OF THE INVENTION

This invention relates to a code translator and particularly to a code translator for use in an associative memory system.

BACKGROUND OF THE INVENTION

An associative memory is an information storage device in which all of the memory's locations may be accessed simultaneously with an information indicative code. Each memory location which contains the information indicative code will provide a match signal on a different predetermined match line. To retrieve the information stored in the memory's matched locations, the address corresponding to the activated match lines must be ascertained. The information stored thereat is then read in the usual manner.

If one and only one match line were activated each time the memory was accessed, a simple code-translating circuit could be employed to identify which of the match lines had been activated by providing a coded signal corresponding to that match line's address.

Since, however, there is no assurance that any match line will be activated or that more than one match line will not be activated, conventional code-translating circuits cannot be employed. If, for example, no match line was activated, a conventional code-translating circuit would still indicate a particular memory location, usually the location comprising all binary zero's. If more than one match line were activated, a conventional code-translating circuit would in some cases provide a code indicating a memory location which was not matched.

For this reason, scanning techniques have been proposed for identifying the match lines which have been activated. Scanning, however, being sequential in nature, consumes a substantial amount of time.

BRIEF DESCRIPTION OF THE INVENTION

In accordance with this invention, a code translator circuit for providing a different predetermined coded output signal in response to activation of each of a plurality of input lines is constructed to exhibit a priority so that activation of one of the input lines inhibits signals appearing on other input lines from effecting circuit operation.

The circuit further provides in addition to the coded output a signal to indicate when at least one input line is activated. This signal is employed to enable a utilization device to respond to the coded output signal.

A plurality of code translation circuits may be cascaded by connecting input line actuation indicative signals from a number of such circuits to input lines of another of such circuits thereby enabling fabrication of a standard circuit which can be interconnected for varying the number of input lines serviceable. The coded output signals from the plurality of circuits are connected in parallel to extend the priority feature to the cascaded circuit.

DESCRIPTION OF THE DRAWING

The sole FIGURE shows a code translator system constructed from a plurality of code translator circuits in accordance with the teachings of the invention.

DETAILED DESCRIPTION referring now to FIG. 1, we see a code translator system including five identical code translator circuits 10 through 14 and a gated utilization device 16. Each code translator 10 through 14 is an identically constructed circuit for indicating in binary code which of four input lines has been activated.

Looking particularly at code translator circuit 10, four input lines 17, 18, 19 and 21 each drive a grounded emitter transistor circuit 22, 23, 24, and 26, respectively. In normal operation, a signal positive with respect to ground is applied to the input lines 17, 18, 19, and 21 to indicate the absence of an input signal. The transistor circuits 22, 23, 24, and 26 provide essentially zero volts at their respective collectors each of which drives an input signal bus 27, 28, 29, and 31, respectively.

When an input signal (zero volts) is applied to the input line 21, the transistor circuit 26 turns off bringing input signal bus 31 to a positive voltage through the collector resistor of the transistor circuit 26. The input signal bus 31 applied the positive voltage to a pair of output lines 33 and 34 through diodes 36 and 37. In a like manner, application of an input signal to input terminal 19 provides a positive signal to the output line 33 through diode 38. No positive voltage appears on the output line 34 since no diode is connected therefrom to the input signal bus 29. When an input signal is applied to the input line 18, a positive signal is applied to the output line 34 through diode 39 while no positive signal is applied to the output line 33. An input signal applied to input line 17 applies no positive signals to the output lines 33 and 34 since the input signal bus 27 is not connected by diodes thereto. Therefore, it is seen that the individual activation of each of the input lines 17, 18, 19, and 21 provides a unique two-bit binary signal on the output lines 33 and 34.

In an associative memory, however, more than one input line may be activated at the same time. Since positive signals are applied to the output lines 33 and 34 through diodes in their low impedance state, a positive signal will override the absence of a positive signal when more than one input signal bus is activated.

Therefore, with a signal applied to input lead 21, positive signals will appear on both output lines 33 and 34 notwithstanding activation of any or all of the other input lines 17, 18, and 19. In a like manner, activation of the input line 17 with any one of the other input lines 18, 19, or 21 activated will not provide an ambiguous output signal since the other activated line will provide the signal which appears on output lines 33 and 34.

If, however, input lines 18 and 19 are simultaneously activated, the diode 38 will provide a positive signal on the output line 33 while the diode 39 will provide an output signal on the output line 34 indicating an input signal on input lead 21 (where in face there is no input signal). To rectify this ambiguity, a transistor 41 is connected in a grounded emitter configuration having its collector tied to the input signal bus 28 and its base to output line 33 through a current limiting resistor. In this way, activation of the output lead 33 through diode 38 turns on transistor 41 which brings the input signal bus 28 back to ground so that no positive signal is applied by diode 39 to output line 34.

In an associative memory, it is also possible for no signals to be applied to any of the input lines 17, 18, 19, and 21. Since the signals appearing on output lines 33 and 34 are the same when no signals are applied to input lines 17, 18, 19, and 21, i.e., no positive signals, as when input line 17 has a signal thereon, the signal buses 27, 28, 29, and 31 are connected to drive an OR gate including diodes 42, 43, 44, 46 and transistor circuit 47 to provide a gating or transfer signal on a lead 417 to indicate whether or not any input signals have been applied to input lines 17, 18, 19, or 21.

The circuitry as above described functions as a code translator circuit capable of providing a two-bit binary code on output leads 33 and 34 indicating which, if any, of the input leads 17, 18, 19 or 21 are actuated. If more than one of the input leads 17, 18, 19, or 21 are actuated, the output leads 33 and 34 will always provide a code indicating one of the actuated input leads. The circuit 10 is also arranged to exhibit a priority so that the code for input lead 21 will have priority over the others while the code for input lead 19 will have priority over those for input leads 17 and 18 while the code for input lead 18 will have priority over the code for input lead 17. A transfer signal is also provided on lead 417 to indicate if any of the signal buses 27, 28, 29, or 31 have positive signals thereon.

One way of providing a code translator circuit having the same properties as code translator circuit 10, with an increased number of input leads is seen by looking at the entire figure in which the number designations employed for elements in code translator circuit 10 are applied to corresponding elements in the remaining code translator circuits 11 through 14 by adding 100, 200, 300, and 400, respectively, thereto.

The output leads 33, 133, 233, and 333 are tied together by a lead 48 of code translator circuits 10 through 13 while the output leads 34, 134, 234, and 334, of the code translator circuits 10 through 13 are tied together by a lead 49. The transfer signal from the code translator circuits 10 through 13 are applied as inputs to input leads 417, 418, 419, and 421, respectively, of the code translator circuit 14. A four-bit digital word is provided by leads 48, 49, 433, and 434 to the utilization device 16 designating on which of the 16 input leads 17 through 19, 21, 117 through 119, 121, 217 through 219, 221, 317 through 319, or 321 a signal is present. The transfer signal from code translator circuit 14 is applied by a lead 51 to gate the utilization device 16.

To fully appreciate how the 16 input-code translator circuit functions, it is helpful to follow its operation through a few examples. With an input signal on lead 21, a positive signal will appear on input signal bus 31 driving leads 48 and 49 positive through diodes 36 and 37 and leads 33 and 34, respectively. The positive signal on bus 31 will drive transistor 47 on through diode 46 providing a negative input signal to input lead 417 of code translator circuit 14. Code translator circuit 14 being identical to code translator circuit 10 will provide no positive signals on leads 433 and 434, but provide a gating signal on lead 51 to enable utilization device 16.

If the presence of positive signals on the leads 48, 49, 433, and 434 are considered binary "1s" and the absence of positive signals considered binary "0s," it could be said that the input lead 21 corresponded to the binary code "1 1 0 0." Activation of each of the input leads 17, 18, 19, or 21 will provide "0s" on the leads 433 and 434, a gating signal on lead 51 and the particular code associated therewith on leads 48 and 49. In a like manner, actuation of each of the leads 117, 118, 119, or 121 will apply a gating or transfer signal to the input lead 418 of code translator circuit 14 thereby providing a "0 1" output on leads 433 and 434 and a transfer or gating signal on lead 51. The signals appearing on leads 48 and 49 will reflect the particular input lead of code translator circuit 11 actuated.

If more than one of the input leads 17, 18, 19, or 21 of code translator circuit 10 were simultaneously actuated, the priorities built into that circuit will provide a proper output designation on the leads 48, 49, 433, and 434. For example, with input leads 21 and 17 simultaneously actuated "1s" would appear on output leads 48 and 49 while "0s" would appear on output leads 433 and 434 and a transfer signal would appear on output lead 51 indicating that input terminal 21 had been actuated.

If corresponding input leads of more than one code translator circuit such as input lead 19 of code translator circuit 10 and input lead 119 of code translator circuit 11 were activated, a proper output signal would be provided on the leads 48, 49, 433, and 434. Activation of each of the input terminals 19 and 119 will provide a "1 0" on output terminals 48 and 49. Input signals would also be applied by the code translator circuits 10 and 11 to input terminals 417 and 418 of code translator circuit 14. The priority of input terminal 418 over 417 would provide a "0 1" output on the terminal 433 and 434 and a gating signal on lead 51. The total output, therefore, would be "1 0 0 1" indicating input terminal 119 which in fact had been actuated.

If input leads 21 and 118 were actuated simultaneously, a correct set of output signals would still appear on output leads 48, 49, 433, and 434. The actuation of input terminal 21 would provide a positive voltage on output leads 48 and 49. The input signal on lead 118 would turn off transistor circuit 123 so that input signal bus 128 would tend to go positive. The positive signal on output lead 48, however, would drive transistor 141 through output lead 133 of code translator circuit 11 on, holding input signal bus 128 at ground notwithstanding the fact that transistor circuit 123 is off.

Therefore, no signal would appear on input lead 418 of code translator circuit 14. An input signal would be provided, however, on input lead 417 of code translator circuit 14 by code translator circuit 10. Therefore, the set of output signals appearing on leads 48, 49, 433, and 434 would be "1 1 0 0" indicating the fourth input lead of the first code translator circuit, i.e., input terminal 21 of code translator circuit 10. It is important to note here that had code translator circuit 11 provided a signal to input lead 418 of code translator circuit 14, an ambiguous output would have been provided because of the priority of input lead 418 over 417.

If input lead 21 of code translator circuit 10 and input lead 117 of code translator circuit 11 were simultaneously actuated, an erroneous set of output signals would be obtained on leads 48, 49, 433, and 434. The output signal bus 31 would apply positive voltages to the leads 48 and 49 and provide an input signal to lead 417 of code translator circuit 14. In a like manner, input signal bus 127 would not affect the signal on leads 48 and 49, but would provide an input signal to lead 418 of code translator circuit 14. Since input signal terminal 418 has priority over input signal terminal 417, the output on leads 433 and 434 would be "0 1." The outputs on leads 48, 49, 433, and 434 taken together would be "1 1 0 1" indicating that input terminal 121, (i.e., the fourth input terminal) of code translator circuit 11 (i.e., the second code translator circuit) had been actuated. This, in fact, is not the case.

To alleviate this ambiguity, so that actuation of lead 21 is indicated, each code translator circuit is provided with three additional transistors such as transistors 52, 53, and 54 in code translator circuit 10 and transistors 152, 153, and 154, in code translator circuit 11. The transistors 52, 53, and 54 together with transistor 41 are arranged in a pattern so that one and only one of the input signal buses 27, 28, 29, or 31 can be positive at any one time. The base circuits of each transistor 41, 52, 53, and 54 are connected to one of the leads 33 or 34 so that output signals provided thereon from the input signal buses through the respective diodes will selectively turn them on. Therefore, with either of the output leads 33 and 34 having a positive signal thereon, one of the transistors 52 or 53 will be on thereby holding the input signal bus 27 at ground. This gives the input 17 associated with input signal bus 27 the lowest priority since signals applied to any of the other inputs 18, 19, or 21 will provide a positive signal on at least one of the output leads 33 or 34.

Not one of the transistors 41, 52, 53, or 54 is connected to the input signal bus 31. On the other hand, actuation of the input signal bus 31 will provide positive signals on the output leads 33 and 34. Since at least one of the transistors 41, 52, 53, and 54 has a collector circuit connected to each of the input signal buses 27, 28, or 29 and a base circuit connected to at least one of the output leads 33 or 34, actuation of the input terminal 21 which provides a positive signal on input signal bus 31 will hold all of the other input signal buses 27, 28, or 29 at ground. This gives input terminals 21 the highest priority.

Looking at the circuit interconnecting input signal buses 28 and 29 and output leads 33 and 34, it is seen that a resistor 56 is connected between the collector of transistor 54 and the anode of diode 38. If not for this resistor, there would be no priority between signals applied to input leads 18 and 19. One and only one signal would be provided on input signal buses 28 and 29 in response to actuation of both input leads 18 and 19 because of the inhibiting affect of transistors 41 and 54, but there would be no clear preference for one or the other.

Therefore, resistor 56 has been added so that a signal applied to lead 34 while turning on transistor 54 bringing the anode of diode 44 to ground, will still provide sufficient voltage on the anode of diode 38 to turn on transistor 41. If, therefore, an input signal were applied to input terminals 18 and 19, input signal bus 28 would go positive transferring the positive voltage through diode 39, lead 34 to the base circuit of the transistor 54 turning on transistor 54 bringing the anode of diode 44 essentially to ground. The actuation of input lead 19 having turned off the transistor 24 will tend to bring the anode of diode 38 positive. The voltage at the anode of diode 38 will be determined by the value of the collector resistor of transistor 24 and resistor 56 which in this case is sufficient even with transistor 54 on to drive the transistor 41 on through diode 38 and output lead 33. As transistor 41 comes on bringing input signal bus 28 back towards ground, transistor 54 will turn off.

In this way by the addition of transistors 41, 52, 53, and 54, a priority has been set up in the code translator circuit 10 such that an input signal applied to input lead 21 will have the highest priority. An input signal applied to input 19 will be next priority followed by a signal applied to input lead 18. A signal applied to input lead 17 will have the lowest priority.

As was seen in one of the previous examples, when input leads 21 and 118 were actuated, the priority system provided by transistors with their base circuits connected to output leads and their collector circuits connected to input signal buses will hold through the parallel combination of the code translator circuits 10, 11, 12, and 13. Therefore, transfer signals will be applied to input leads 417, 418, 419, and 421 of code translator circuit 14 only by the one of code translator circuits 10, 11, 12, or 13 that has an input signal at one of its input leads that has the highest priority of any input signal applied to any of the four code translator circuits 10, 11, 12, and 13.

It is possible, however, for more than one of the code translator circuits 10, 11, 12, and 13 to provide a transfer signal. This can happen if both have input signals on terminals having the same priority. For example, when both input terminals 19 and 119 are actuated, transfer signals are applied to input leads 417 and 418 of code translator circuit 14. This example has been previously discussed and it was shown that no ambiguity results therefrom.

It should be clear that while this invention has been described with circuits employing bipolar transistors and diodes that numerous other types of components, for example field effect transistors, could be substituted therefor. Further, numerous other specific configurations of components can be devised by those skilled in the art in practicing the above-described invention without departing from the spirit or scope thereof.

What is claimed is:

1. A code translator circuit having a set of output lines and a plurality of input signal buses in which a different predetermined coded signal is provided on said set of output lines in response to a signal applied to each of said plurality of input signal buses characterized by:
- means responsive to a signal provided on one of said set of output lines for inhibiting a signal from being applied to one of said plurality of input signal buses.

2. A code-translating circuit responsive to a plurality of coded input signals which exhibits a predetermined priority for providing coded output signals including:
- first, second, third and fourth means for providing first, second, third and fourth signals in response to first, second, third and fourth signals in response to first, second, third and fourth coded input signals respectively;
- means responsive to said fourth signal for providing a digit signal to first and second output lines;
- means responsive to said third signal for providing said digit signal to said first output line;
- means responsive to said second signal for providing said digit signal to said second output line;
- means responsive to said digit signal on said first output line for inhibiting said first and second signals; and
- means responsive to said digit signal on said second output line for inhibiting said first and third signals.

3. The code-translating circuit as defined in claim 2 in which said first, second, third and fourth signal providing means are input signal buses.

4. The code-translating circuit as defined in claim 2 also including:
- means responsive to either said first, second, third, or fourth signals for providing a transfer signal.

5. The code-translating circuit as defined in claim 4 wherein:
- said means for inhibiting said second signal includes means for loading said second signal with a first impedance value; and
- said means for inhibiting said third signal includes means for loading said third signal with a second impedance value, said second impedance value being higher than said first impedance value so that said third signal will have priority over said second signal.

6. The code-translating circuit as defined in claim 4 also including:
- means responsive to said transfer signal for utilizing signals on said first and second output lines.

7. In combination:
- first and second code-translating circuits each of said code-translating circuits having a set of output lines and a plurality of input signal buses for providing a different predetermined coded signal on said set of output lines in response to a signal on said set of output lines applied to each of said plurality of input signal buses; each of said code translator circuit also providing a transfer signal in response to actuation of any of said input signal buses;
- means for connecting each said set of output lines of said first code translator circuit to a corresponding one of said output lines of said second code translator circuit;
- a third code translator circuit; and
- means for applying said transfer signal from said first and second code translator circuits to said third code translator circuit.